(12) United States Patent
Wang et al.

(10) Patent No.: US 9,178,216 B2
(45) Date of Patent: Nov. 3, 2015

(54) LITHIUM ION BATTERY CATHODE AND LITHIUM ION BATTERY USING THE SAME

(75) Inventors: Jia-Ping Wang, Beijing (CN); Shu Luo, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 718 days.

(21) Appl. No.: 13/215,648

(22) Filed: Aug. 23, 2011

(65) Prior Publication Data

US 2012/0295161 A1  Nov. 22, 2012

(30) Foreign Application Priority Data

May 20, 2011  (CN) .......................... 2011 1 0131295

(51) Int. Cl.
| | |
|---|---|
| *H01M 4/13* | (2010.01) |
| *H01M 4/62* | (2006.01) |
| *H01M 4/80* | (2006.01) |
| *H01M 10/052* | (2010.01) |
| *H01M 4/02* | (2006.01) |

(52) U.S. Cl.
CPC .............. *H01M 4/625* (2013.01); *H01M 4/806* (2013.01); *H01M 10/052* (2013.01); *H01M 2004/028* (2013.01); *Y02E 60/122* (2013.01)

(58) Field of Classification Search
CPC ... H01M 4/625; H01M 4/806; H01M 10/052; H01M 2004/028; Y02E 60/122
USPC ........... 429/231.8, 221, 232, 223, 224, 231.1; 977/948, 742
See application file for complete search history.

(56) References Cited

U.S. PATENT DOCUMENTS

| | | | |
|---|---|---|---|
| 2002/0182495 A1* | 12/2002 | Ogura et al. ................ | 429/218.1 |
| 2006/0141361 A1* | 6/2006 | Yuasa et al. .................. | 429/232 |
| 2009/0142665 A1* | 6/2009 | Sheem et al. ................. | 429/213 |
| 2009/0297952 A1 | 12/2009 | Yasunaga et al. | |
| 2010/0323246 A1* | 12/2010 | Feng et al. .................... | 429/232 |

FOREIGN PATENT DOCUMENTS

| | | |
|---|---|---|
| CN | 101573812 | 11/2009 |
| TW | 200921970 | 5/2009 |

* cited by examiner

*Primary Examiner* — Gary Harris
(74) *Attorney, Agent, or Firm* — Novak Druce Connolly Bove + Quigg LLP

(57) ABSTRACT

The present disclosure relates to a lithium ion battery cathode. The lithium ion battery cathode includes a plurality of cathode active material particles and a conductive carrier. The conductive carrier includes a plurality of carbon nanotubes. The plurality of carbon nanotubes are entangled with each other to form a net structure. The present disclosure also relates to a lithium ion battery.

13 Claims, 8 Drawing Sheets

LITHIUM ION BATTERY CATHODE AND LITHIUM ION BATTERY USING THE SAME

CROSS-REFERENCE TO RELATED APPLICATIONS

This application claims all benefits accruing under 35 U.S.C. §119 from China Patent Application No. 201110131295.2, filed on May 20, 2011, in the China Intellectual Property Office, the contents of which are hereby incorporated by reference.

BACKGROUND

1. Technical Field

The present disclosure relates to lithium ion battery cathodes and lithium ion batteries using the same, particularly, to a carbon nanotube based lithium ion battery cathode and a lithium ion battery using the same.

2. Description of Related Art

A typical lithium ion battery mainly includes a cathode, an anode, a separator, and an electrolyte. The cathode usually includes cathode active material, conductive particles, and adhesive. The adhesive is used to bond the cathode active material and conductive particles together, so that the cathode can have a stable structure with a desired shape. The adhesive is usually composed of insulative organic material. The organic material includes polyvinylidene fluoride (PVDF), polyfluortetraethylene (PTFE), or styrene-butadiene rubber (SBR). A mass ratio of the adhesive to the cathode is usually about 10%. Thus, the adhesive would decrease the conductivity and specific capacity of the cathode.

What is needed, therefore, is to provide a lithium ion battery cathode without adhesive, and a lithium ion battery using the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
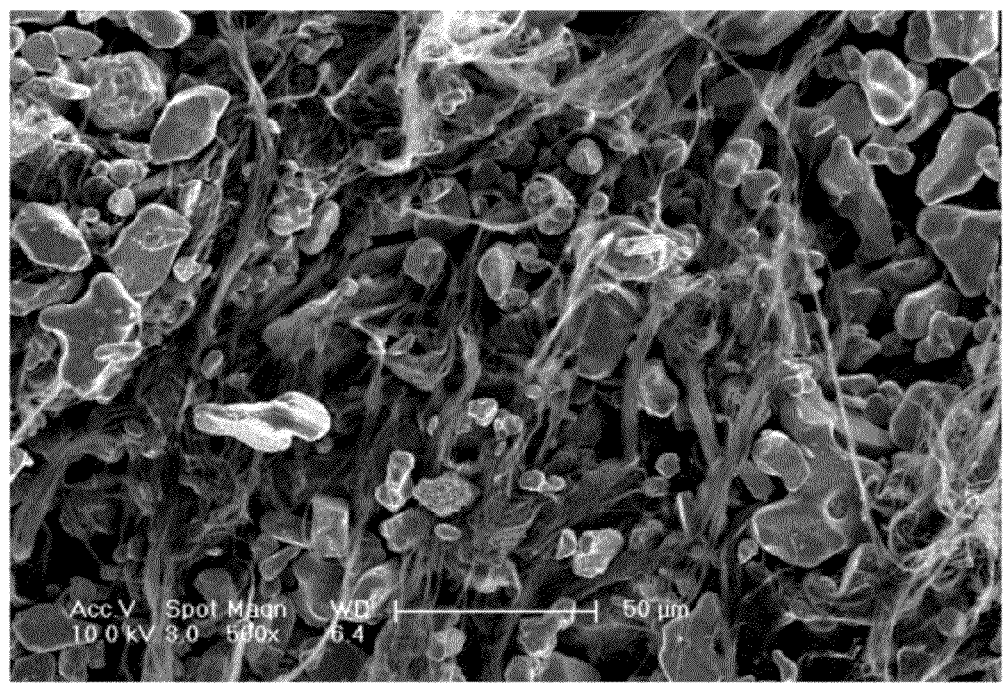
FIG. 1 is a Scanning Electron Microscope (SEM) image of one embodiment of a lithium ion battery cathode.
Figure 2:
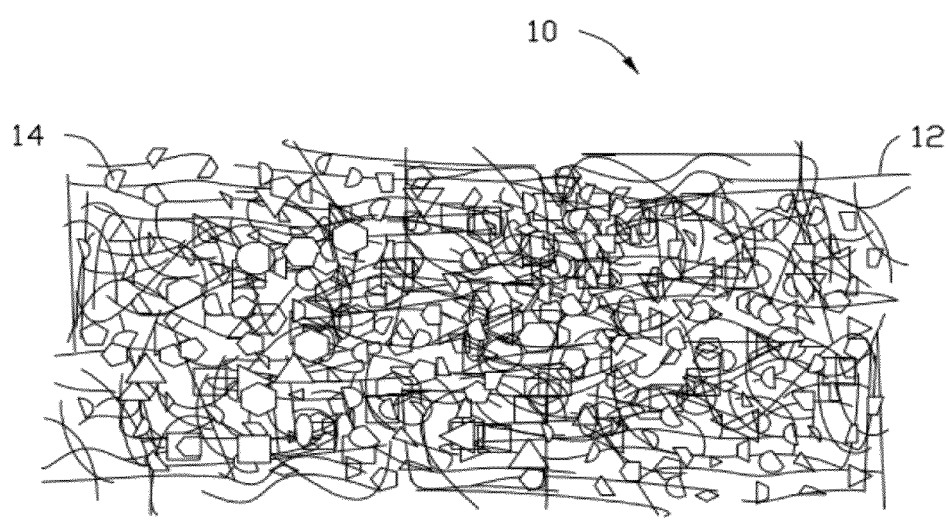
FIG. 2 is a structural schematic view of the lithium ion battery cathode of FIG. 1.

Referring to FIGS. 1 and 2, one embodiment of a lithium ion battery cathode 10 includes a plurality of cathode active material particles 14 and a conductive carrier. The conductive carrier includes a plurality of carbon nanotubes 12. The plurality of carbon nanotubes 12 are entangled with each other to form a net structure. The plurality of cathode active material particles 14 are dispersed in the net like structure and attached on the surface of the carbon nanotubes 12.

Figure 3:
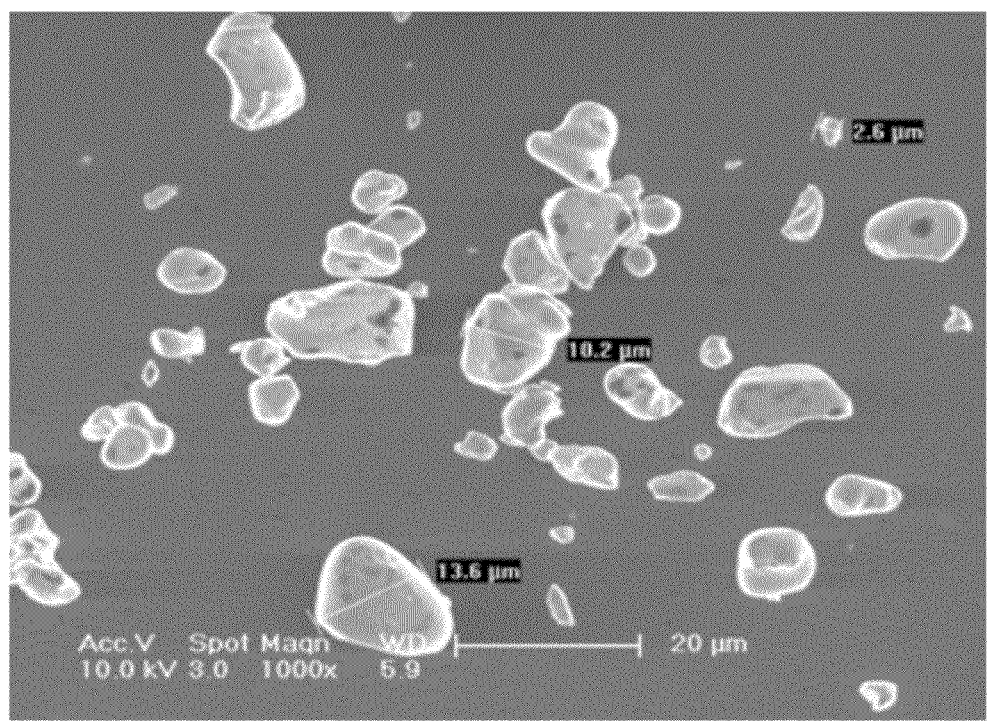
FIG. 3 is an SEM image of lithium cobalt oxide particles.

A material of the cathode active material particle 14 can be doped or undoped of spinel lithium manganese oxide (e.g., $LiMn_2O_4$), layer-shaped lithium manganese oxide (e.g., $LiMnO_2$), lithium nickel oxide (e.g., $LiNiO_2$), lithium cobalt oxide (e.g., $LiCoO_2$), lithium iron phosphate (e.g., $LiFePO_4$), lithium nickel cobalt manganese oxide (e.g., $LiNi_{1/3}Co_{1/3}Mn_{1/3}O_2$), lithium nickel cobalt oxide (e.g., $LiNi_{0.8}Co_{0.2}O_2$), or any combination thereof. A shape of the cathode active material particle 14 is not limited, and can be irregular or regular. A diameter of the cathode active material particle 14 can be in a range from about 10 nanometers (nm) to about 100 micrometers (μm). Referring to FIG. 3, in one embodiment, the cathode active material particles 14 can be lithium cobalt oxide particles having a diameter less than 15 μm.

Figure 4:
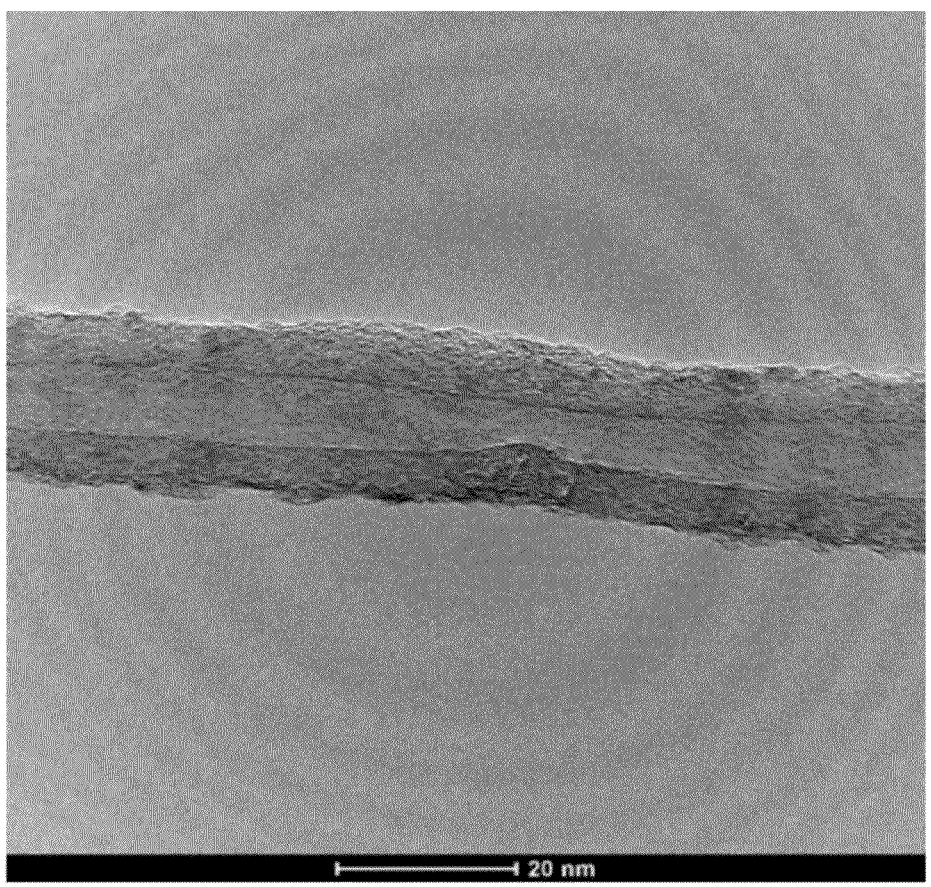
FIG. 4 is a Transmission Electron Microscope (TEM) image of a carbon nanotube in the lithium ion battery cathode of FIG. 1.

In the conductive carrier, the carbon nanotubes 12 are entangled with each other and combined by van der Waals attractive force therebetween, thereby forming an integral continuous net structure having a plurality of micropores defined by the carbon nanotubes 12. The net structure can be a free-standing structure. The term "free-standing structure" means that the net structure can sustain the weight of itself when it is hoisted by a portion thereof without any significant damage to its structural integrity. So, if the net structure is placed between two separate supports, a portion of the net structure, not in contact with the two supports, would be suspended between the two supports and yet maintain structural integrity. The free-standing structure is different from powder which would fall if the powder is not in contact with the support. In addition, the carbon nanotubes 12 are aligned in disorder, and the net structure composed of the carbon nanotubes 12 is isotropic. A density distribution of the carbon nanotubes 12 in the net structure is substantially the same, or mass ratios of the carbon nanotubes 12 to the lithium ion battery cathode 10 per unit volume are substantially the same. Thus, a resistivity of the lithium ion battery cathode 10 can be uniform. The carbon nanotubes 12 can be single-walled carbon nanotubes, double-walled carbon nanotubes, or multi-walled carbon nanotubes. A diameter of the carbon nanotube can be in a range from about 1 nm to about 200 nm. Referring to FIG. 4, the carbon nanotube 12 is pure, and has no impurities adhered thereon. A length of the carbon nanotubes 12 can be the same or different. The length of carbon nanotubes 12 can be longer than about 200 μm. In one embodiment, the length of carbon nanotubes 12 are the substantially the same and longer than 300 μm.

The carbon nanotubes 12 in the lithium ion battery cathode 10 can serve as a conductive material and microporous carrier to support and fix the cathode active material particles 14. Thus, even without using an adhesive, the lithium ion battery cathode 10 can be an integrative stable structure due to the net structure composed of the carbon nanotubes 12. The cathode active material particles 14 are uniformly distributed in the net structure. Specifically, the cathode active material particles 14 can be adhered on or entangled by the carbon nanotubes, or the cathode active material particles 14 can be wrapped by the carbon nanotubes. The cathode active material particles 14 and the carbon nanotubes are in contact with each other without adhesive therebetween. The cathode active material particles 14 and the carbon nanotubes are fixed together by van der Waals attractive force therebetween.

Furthermore, the conductive carrier can further include a plurality of conductive particles uniformly dispersed in the net structure. If the conductive carrier includes the conductive particles, the conductive particles and the cathode active material particles 14 will be mixed with each other. The conductive particles can also be fixed in the net structure. The conductive particles can be graphite, acetylene black, carbon fibers, or any combination thereof.

In one embodiment, the conductive carrier only includes carbon nanotubes 12. Namely, the lithium ion battery cathode 10 only includes the carbon nanotubes 12 and the cathode active material particles 14. A mass ratio of the carbon nanotubes 12 to the lithium ion battery cathode 10 can be larger than or equal to 0.1% and less than 10.0% (e.g. 0.1%, 1.0%, or 5.0%). In one embodiment, the mass ratio of the carbon nanotubes 12 to the lithium ion battery cathode 10 is less than or equal to 5.0%. A mass ratio of the cathode active material particles 14 to the lithium ion battery cathode 10 can be larger than or equal to 90.0% and less than or equal to 99.9%. In one embodiment, the mass ratio of the cathode active material particles 14 to the lithium ion battery cathode 10 is larger than or equal to 95.0% and less than or equal to 99.9%.

Figure 5:
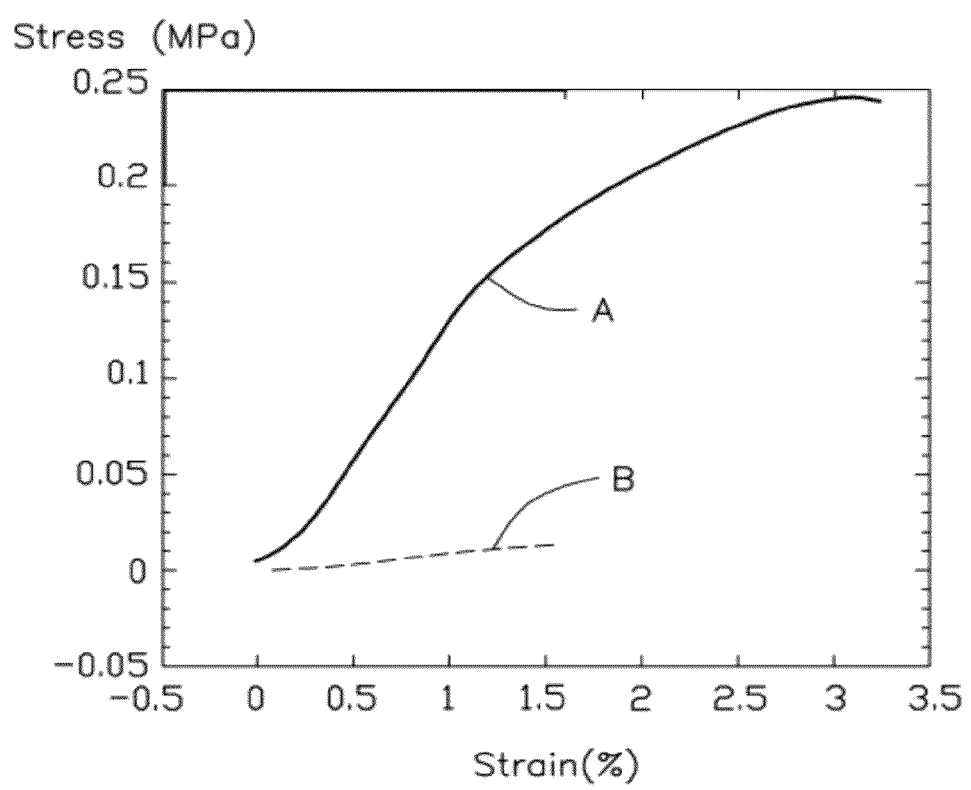
FIG. 5 is a graph showing stress-strain curves of the lithium ion battery cathode of FIG. 1 and a lithium ion battery cathode with adhesive.

In the lithium ion battery cathode 10, the carbon nanotubes 12 having long lengths are entangled with each other to form the microporous net structure. The cathode active material particles 14 are absorbed on the surfaces of the carbon nanotubes 12, secured or wrapped by the carbon nanotubes 12, and/or located in the micropores. Thus, the cathode active material particles 14 can be fixed in the net structure, thereby forming an integral stable structure. In addition, if the other conductive particles are further included in the lithium ion battery cathode 10, the conductive particles also can be absorbed on the surfaces of the carbon nanotubes 12 and/or entangled or wrapped by the carbon nanotubes 12. Referring to FIG. 5, curve A represents a stress-strain curve of one embodiment of the lithium ion battery cathode 10 without the adhesive, and curve B represents a stress-strain curve of a conventional lithium ion battery cathode with the polyfluortetraethylene (PTFE) adhesive. In the embodiment, the lithium ion battery cathode 10 only includes the cathode active material particles 14 and the carbon nanotubes. The cathode active material particles 14 are lithium cobalt oxide particles. The mass ratio of the lithium cobalt oxide particles to the carbon nanotubes 12 is 8:0.2. The conventional lithium ion battery cathode with the PTFE adhesive includes lithium cobalt oxide particles, carbon black, and PTFE adhesive. The mass ratio of the lithium cobalt oxide particles to carbon black to polyfluortetraethylene adhesive is 8:0.5:1. As shown in FIG. 5, strength of the lithium ion battery cathode 10 is much higher than the strength of the conventional lithium ion battery cathode with the PTFE adhesive. Thus, although the lithium ion battery cathode 10 does not include the adhesive, the lithium ion battery cathode 10 still has a good strength for satisfying the application.

Figure 6:
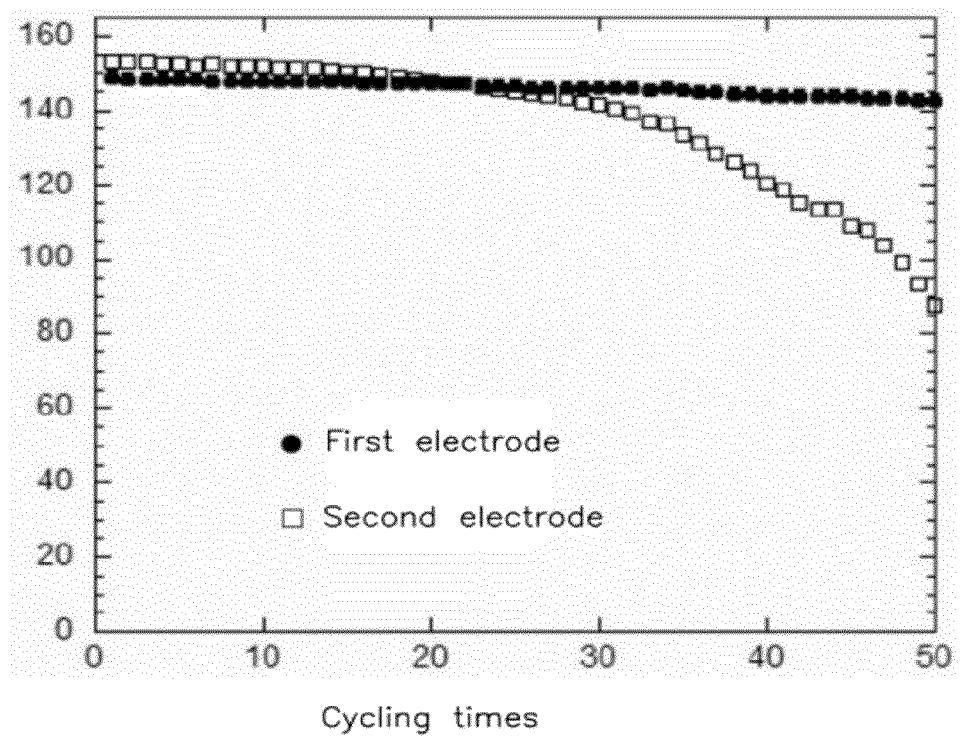
FIG. 6 is a test graph showing discharge cycling properties of a lithium ion battery using the cathode of FIG. 1 and a lithium ion battery using the cathode with adhesive.
Figure 7:
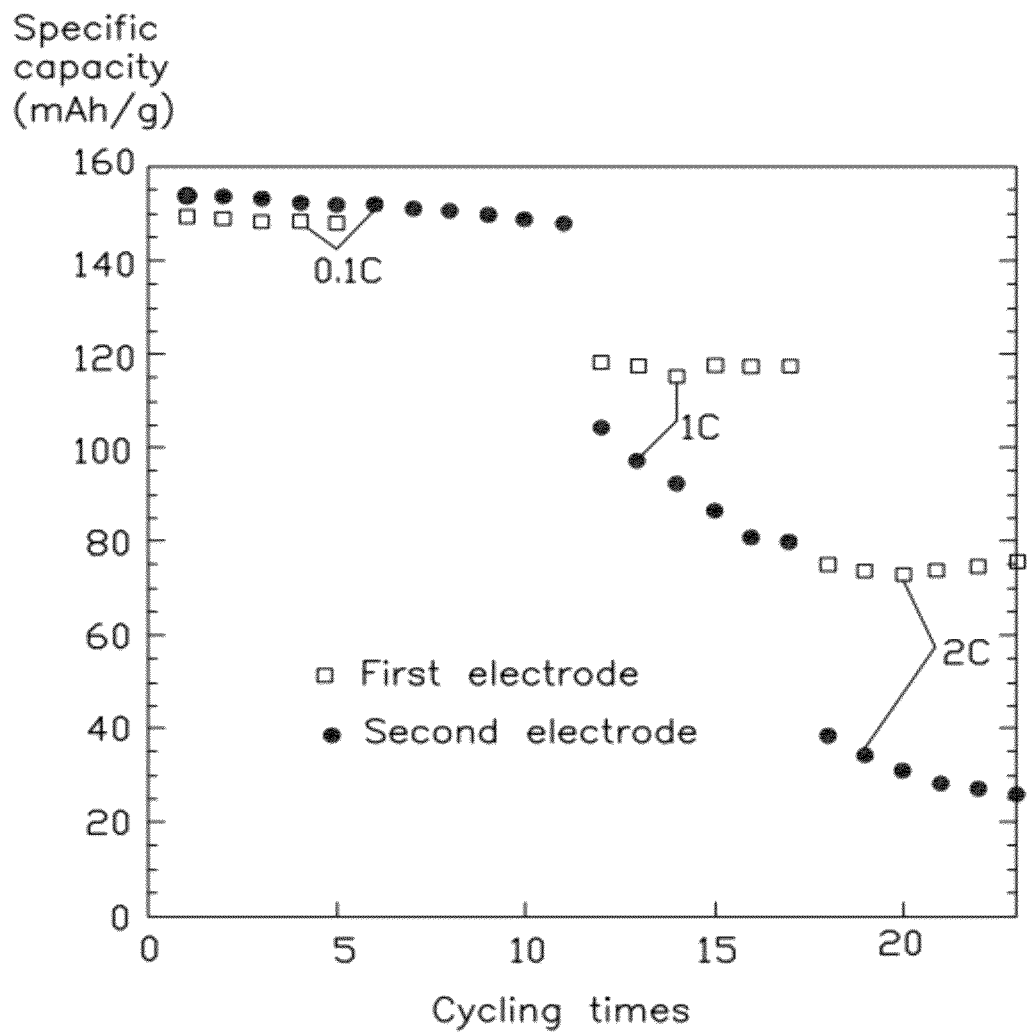
FIG. 7 is a test graph showing rate properties of the lithium ion battery using the cathode of FIG. 1 and the lithium ion battery using the cathode with adhesive.

Referring to FIGS. 6 and 7, the first electrode represents one embodiment of the lithium ion battery cathode 10. The second electrode represents a conventional lithium ion battery cathode. The first electrode only includes the lithium cobalt oxide particles and the carbon nanotubes 12. The mass ratio of the lithium cobalt oxide particles to the carbon nanotubes 12 is 8:0.2. The second electrode includes lithium cobalt oxide particles, carbon black, and PTFE adhesive. The mass ratio of the lithium cobalt oxide particles to carbon black to PTFE adhesive is 8:0.2:1. Both the first electrode and the second electrode are pressed and cut into round discs having a diameter of 7 millimeters (mm), and a thickness of 0.34 mm. A resistivity of the first electrode and the second electrode are tested. The resistivity of the first electrode is about $0.89 \times 10^{-3}$ $\Omega \cdot m$. The resistivity of the second electrode is about $491 \times 10^{-3}$ $\Omega \cdot m$. Thus, a conductivity of the first electrode is much higher than the conductivity of the second electrode, because the first electrode does not include insulative adhesive, accordingly, the cathode active material particles 14 can directly contact each other without obstructiveness of the adhesive.

As shown in FIG. 6, after a first battery using the first electrode and a second battery using the second electrode being discharged in excess of 20 times, a cycling property of the first electrode is better than the cycling property of the second electrode during the more than 20 discharged processes. The first electrode has a better capacity retention rate than the second electrode.

As shown in FIG. 7, the first electrode and the second electrode have the substantially the same discharge cycling property at a low rate of 0.1 coulomb (C). The discharge cycling property of the first electrode is better than that of the second electrode at a high rate (e.g. 1 C or 2 C). Thus, the first electrode has a better discharge cycling property at a high rate than the second electrode. In addition, the specific capacity of the second electrode rapidly decreases as the rate increases. Comparatively, the specific capacity of the first electrode slowly decreases as the rate increases. Thus, the rate property of the first electrode is better than that of the second electrode.

The lithium ion battery cathode 10 has better conductivity and charge or discharge cycling property at a high rate than the conventional lithium ion battery cathode with the adhesive. In addition, the lithium ion battery cathode 10 does not include adhesive. Thus, if the lithium ion battery cathode 10 and the conventional lithium ion battery cathode have the same weight, the weight of the cathode active material particles 14 in the lithium ion battery cathode 10 can be 10% higher than the weight of the cathode active material particles 14 of the conventional lithium ion battery cathode. In other words, if the lithium ion battery cathode 10 and the conventional lithium ion battery cathode have the same specific capacity and total capacity, the lithium ion battery cathode 10 will weight less than the conventional lithium ion battery cathode.

In one embodiment, the lithium ion battery cathode 10 further includes a small amount of carbon black. A mass ratio of the carbon black to the lithium ion battery cathode 10 can be less than 2%. In one embodiment, the mass ratio of the carbon black to the lithium ion battery cathode 10 is less than or equal than 1%. The mass ratio of the carbon nanotubes 12 to the lithium ion battery cathode 10 is larger than or equal to 0.1% and less than 10.0%. The carbon black can exist in a form of particles. The carbon black can be uniformly distributed in the net structure composed of the carbon nanotubes, thereby increasing the conductivity and the specific capacity of the lithium ion battery cathode 10.

Figure 8:
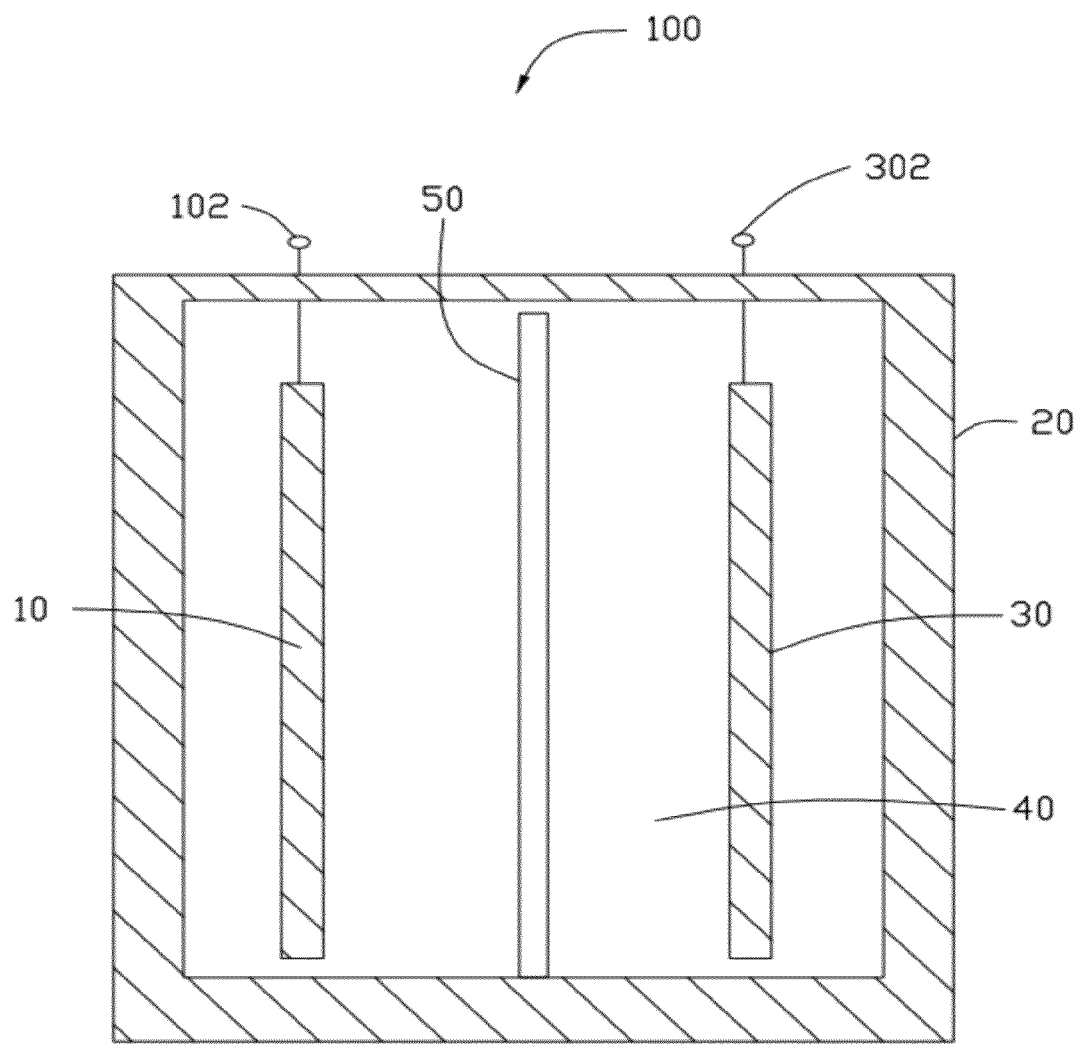
FIG. 8 is a structural schematic view of a lithium ion battery using the lithium ion battery cathode of FIG. 1.

Referring to FIG. 8, one embodiment of a lithium ion battery 100 using the lithium ion battery cathode 10 includes: the lithium ion battery cathode 10, the anode 30, the separator 50, the nonaqueous electrolyte solution 40, an external encapsulating shell 20, a cathode terminal 102, and an anode terminal 302. The lithium ion battery cathode 10, the anode 30, the separator 50, and the nonaqueous electrolyte solution 40 are encapsulated in the encapsulating shell 20. The lithium ion battery cathode 10 and the anode 30 are stacked with each other and sandwich the separator 50. The lithium ion battery cathode 10 and the anode 30 can be in contact with or spaced from the separator 50. The cathode terminal 102 is electrically connected with the cathode 10. The anode terminal 302 is electrically connected with the anode 30.

Furthermore, the cathode 10 can be further disposed on a cathode current collector (not shown). The anode 30 can also be further disposed on an anode current collector (not shown). The cathode current collector and the anode current collector can be a metal sheet. In addition, the carbon nanotubes 12 in the lithium ion battery cathode 10 are entangled with each other to form the net structure, and the carbon nanotubes 12 are combined with each other by van der Waals attractive force. The net structure can be a free-standing structure. Thus, the cathode current collector is optional, namely, the cathode 10 can exist without being supported by the cathode current collector.

In use, a voltage is applied to the lithium ion battery 100 by the cathode terminal 102 and the anode terminal 302. Accordingly, the lithium ion battery 100 is charged or discharged.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium ion battery cathode consisting of: a plurality of lithium cobalt oxide particles and a plurality of carbon nanotubes, wherein a mass ratio of the lithium cobalt oxide particles to the carbon nanotubes is 8:0.2, the plurality of carbon nanotubes are entangled with each other to form a net structure, the carbon nanotubes are pure and have no impurities adhered thereon, and the cathode active material particles are wrapped by the carbon nanotubes.

2. The lithium ion battery cathode as claimed in claim 1, wherein the net structure has a plurality of micropores defined by the plurality of carbon nanotubes.

3. The lithium ion battery cathode as claimed in claim 2, wherein the plurality of cathode active material particles are located in the plurality of micropores, or secured by the plurality of carbon nanotubes.

4. The lithium ion battery cathode as claimed in claim 1, the plurality of lithium cobalt oxide particles and the plurality of carbon nanotubes are fixed together by van der Waals attractive force therebetween.

5. The lithium ion battery cathode as claimed in claim 1, wherein the net structure is a free-standing structure.

6. The lithium ion battery cathode as claimed in claim 1, wherein the plurality of lithium cobalt oxide particles are uniformly dispersed in the net structure.

7. The lithium ion battery cathode as claimed in claim 1, wherein a length of the plurality of carbon nanotubes is larger than or equal to 200 μm.

8. The lithium ion battery cathode as claimed in claim 7, wherein the plurality of carbon nanotubes have substantially the same length.

9. A lithium ion battery cathode consisting of a plurality of cathode active material particles, and a net structure comprising a plurality of carbon nanotubes entangled with each other, the carbon nanotubes are pure and have no impurities adhered thereon, the cathode active material particles are wrapped by the carbon nanotubes, wherein the plurality of cathode active material particles are lithium cobalt oxide particles, and a mass ratio of the lithium cobalt oxide particles to the carbon nanotubes is 8:0.2.

10. The lithium ion battery cathode as claimed in claim 9, wherein the net structure has a plurality of micropores, the plurality of cathode active material particles are located in the plurality of micropores or secured by the plurality of carbon nanotubes.

11. The lithium ion battery cathode as claimed in claim 9, wherein the plurality of cathode active material particles are uniformly dispersed in the net structure.

12. The lithium ion battery cathode as claimed in claim 9, wherein the plurality of cathode active particles and the plurality of carbon nanotubes are fixed together by van der Waals attractive force therebetween.

13. The lithium ion battery cathode as claimed in claim 9, wherein the plurality of carbon nanotubes are aligned in disorder and are combined with each other by van der Waals attractive force.

* * * * *